(12) United States Patent
Li et al.

(10) Patent No.: US 12,393,665 B2
(45) Date of Patent: Aug. 19, 2025

(54) METHOD OF PROCESSING CROSS-DOMAIN AUTHORIZATION AND METHOD OF PROCESSING CROSS-DOMAIN CALL

(71) Applicant: BOE TECHNOLOGY GROUP CO., LTD., Beijing (CN)

(72) Inventors: Dawei Li, Beijing (CN); Yawen Tang, Beijing (CN); Huan Lv, Beijing (CN); Lisha Dou, Beijing (CN); Hao Xu, Beijing (CN); Zhanqiu Yue, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/758,126

(22) PCT Filed: Aug. 27, 2021

(86) PCT No.: PCT/CN2021/114923
§ 371 (c)(1),
(2) Date: Jun. 28, 2022

(87) PCT Pub. No.: WO2023/024057
PCT Pub. Date: Mar. 2, 2023

(65) Prior Publication Data
US 2024/0193249 A1  Jun. 13, 2024

(51) Int. Cl.
*G06F 21/00* (2013.01)
*G06F 21/44* (2013.01)

(52) U.S. Cl.
CPC .................... *G06F 21/44* (2013.01)

(58) Field of Classification Search
CPC ......... G06F 21/44; G06F 21/62; H04L 63/10; H04L 63/20
See application file for complete search history.

(56) References Cited

U.S. PATENT DOCUMENTS 8,117,325 B1 * 2/2012 Wu ........................ H04L 63/10
713/168
10,469,472 B2  11/2019 Main et al.
(Continued)

FOREIGN PATENT DOCUMENTS

CN  101262474 A  9/2008
CN  105830477 A  8/2016
(Continued)

OTHER PUBLICATIONS

International Search Report dated Mar. 28, 2022, for corresponding PCT Application No. PCT/CN2021/114923.
(Continued)

*Primary Examiner* — Yogesh Paliwal
(74) *Attorney, Agent, or Firm* — Kinney & Lange, P.A.

(57) ABSTRACT

The present disclosure provides a method of processing a cross-domain authorization, which relates to a field of Internet technology. The method includes: displaying, in response to a received policy deployment request, at least one cross-domain authorization option associated with a target application, wherein the target application is an application to be configured for a cross-domain authorization indicated by the policy deployment request; acquiring policy description data input by a user for the at least one cross-domain authorization option; generating a cross-domain authorization policy for the target application according to the policy description data; and associating the cross-domain authorization policy with an application programming interface API object of the target application, so as to perform a cross-domain call for the target application according to the associated API object and cross-domain authorization policy. The present disclosure further provides a method of processing a cross-domain call, a platform of processing a cross-domain control, a system of implementing a cross- (Continued)

domain call, an electronic device, a computer-readable storage medium, and a computer program product.

19 Claims, 10 Drawing Sheets

(56) References Cited

U.S. PATENT DOCUMENTS

| | | | | |
|---|---|---|---|---|
| 10,826,775 | B1* | 11/2020 | Moreno | .................. H04L 45/64 |
| 11,356,431 | B2 | 6/2022 | Main et al. | |
| 11,853,463 | B1* | 12/2023 | Hinrichs | ............... G06F 21/629 |
| 2009/0276835 | A1* | 11/2009 | Jackson | .................. G06F 21/54 |
| | | | | 709/201 |
| 2010/0250653 | A1 | 9/2010 | Hudgeons et al. | |
| 2012/0215829 | A1* | 8/2012 | Naphade | ................ G06N 20/00 |
| | | | | 709/203 |
| 2013/0219456 | A1* | 8/2013 | Sharma | .................. H04L 9/0894 |
| | | | | 726/1 |
| 2017/0331832 | A1 | 11/2017 | Lander et al. | |
| 2021/0029097 | A1 | 1/2021 | Kurdziel et al. | |
| 2021/0240550 | A1* | 8/2021 | Hinrichs | ................. H04L 63/10 |
| 2022/0021711 | A1* | 1/2022 | Marsh | ................... H04L 9/3247 |
| 2022/0053027 | A1* | 2/2022 | Weiss | ..................... H04L 63/20 |

FOREIGN PATENT DOCUMENTS

| | | |
|---|---|---|
| CN | 110830509 A | 2/2020 |
| CN | 110995746 A | 4/2020 |
| CN | 111147588 A | 5/2020 |
| CN | 112580006 A | 3/2021 |

OTHER PUBLICATIONS

URL: https://help.aliyun.com/document_detail/89765.html, accessed Aug. 25, 2020.
URL:https://support.huawei cloud.com/usermanual-apig/apig-usermanual.pdf, accessed Jun. 29, 2021.
"Construction of hydrological data sharing system based on API service gateway technology," Cheng Qinghua (Henan Provincial Bureau of Hydrology and Water Resources), Sep. 2020.

* cited by examiner

| | |
|---|---|
| Cross-domain authorization option | ✕ |

*Application: [Select ⌄]

*Cross-domain policy [                    ]

Description: [                    ]

*Option transmission:  ○  Allowed     ⦿  Not allowed

*Pre-check time (s): [Integers from -1~7200 are available, 0 means unlimited]

*Request source: [Protocol (http or https)+domain name, or IP address+port] ⊕

Allowed request method:  ☑ POST   ☑ GET   ☑ PUT   ☑ DELETE

Allowed request header: [                    ] ⊕

Exposed request header: [                    ] ⊕

[Cancle]  [Ok]

FIG. 3

| API basic service information | | | | Import |
|---|---|---|---|---|

*Chinese name: [    ]   *English name: [    ]

*Version: [    ]   *Associated application: [ ▽ ] [create]

*Description: [    ]   *LOGO:

Service interface information

| Service enabled: | ⊙◯ | Cross-domain enabled: | ⊙◯ |
|---|---|---|---|
| Cross-domain authorization policy: | [ ▽ ] | *Authentication method | [ token ▽ ] |
| *External call limit (times/second) | [− 0 +] | *Access protocol type: | [ Restful ▽ ] |
| *Internal call limit (times/second) | [− 0 +] | Apply to entire application | ◯⊙ |
| *Service interface address | [    ] | *Method type: | [ GET ▽ ] |
| *Request form: | [ ▽ ] | Fusion protection | ◯⊙ |

FIG. 4

METHOD OF PROCESSING CROSS-DOMAIN AUTHORIZATION AND METHOD OF PROCESSING CROSS-DOMAIN CALL

CROSS REFERENCE TO RELATED APPLICATION(S)

This application is the national phase of PCT application No. PCT/CN2021/114923 filed on Aug. 27, 2021, the contents of which are incorporated herein by reference in their entirety.

TECHNICAL FIELD

The present disclosure relates to a field of Internet technology, in particular to a method of processing a cross-domain authorization, a method of processing a cross-domain call, a platform of processing a cross-domain control, a system of implementing a cross-domain call, an electronic device, a computer-readable storage medium, and a computer program product.

BACKGROUND

At present, a technical architecture of front-end and back-end separation is adopted in product R&D or business system of some projects. In such a technical architecture mode, a cross-domain call service is easy to occur between different terminals or application servers. A rationality and a timeliness of a cross-domain authorization policy formulated for shared resources may affect a security of the cross-domain call service.

SUMMARY

The present disclosure provides a method of processing a cross-domain authorization, a method of processing a cross-domain call, a platform of processing a cross-domain control, a system of implementing a cross-domain call, an electronic device, a computer-readable storage medium, and a computer program product.

According to a first aspect of the present disclosure, there is provided a method of processing a cross-domain authorization, including: displaying, in response to a received policy deployment request, at least one cross-domain authorization option associated with a target application, wherein the target application is an application to be configured for a cross-domain authorization indicated by the policy deployment request; acquiring policy description data input by a user for the at least one cross-domain authorization option; generating a cross-domain authorization policy for the target application according to the policy description data; and associating the cross-domain authorization policy with an application programming interface API object of the target application, so as to perform a cross-domain call for the target application according to the associated API object and cross-domain authorization policy.

According to a second aspect, there is provided a method of processing a cross-domain call, including: receiving a cross-domain call request from a requester, wherein the cross-domain call request indicates a target application the requester requests to call, and the requester and the target application belong to different network domains; acquiring a preset cross-domain authorization policy associated with an API object of the target application, wherein the API object is an interface object for the target application to provide a cross-domain call service; determining, according to the cross-domain authorization policy and the cross-domain call request, whether the requester has a cross-domain call permission for the target application; and establishing a cross-domain route between the requester and the target application in response to determining that the requester has the cross-domain call permission for the target application, so that the target application acquires and responds to the cross-domain call request based on the cross-domain route.

According to a third aspect, there is provided a platform of processing a cross-domain control, including: a display module configured to display, in response to a received policy deployment request, at least one cross-domain authorization option associated with a target application, wherein the target application is an application to be configured for a cross-domain authorization indicated by the policy deployment request; a first acquisition module configured to acquire policy description data input by a user for the at least one cross-domain authorization option; a first processing module configured to generate a cross-domain authorization policy for the target application according to the policy description data; and a second processing module configured to associate the cross-domain authorization policy with an application programming interface API object of the target application, so as to perform a cross-domain call for the target application according to the associated API object and cross-domain authorization policy.

According to a fourth aspect, there is provided a platform of processing a cross-domain control, including: a receiving module configured to receive a cross-domain call request from a requester, wherein the cross-domain call request indicates a target application the requester requests to call, and the requester and the target application belong to different network domains; a second acquisition module configured to acquire a preset cross-domain authorization policy associated with an API object of the target application, wherein the API object is an interface object for the target application to provide a cross-domain call service; a third processing module configured to determine, according to the cross-domain authorization policy and the cross-domain call request, whether the requester has a cross-domain call permission for the target application; and a fourth processing module configured to establish a cross-domain route between the requester and the target application in response to determining that the requester has the cross-domain call permission for the target application, so that the target application acquires and responds to the cross-domain call request based on the cross-domain route.

According to a fifth aspect, there is provided a system of implementing a cross-domain call, comprising: the platform of processing the cross-domain control according to the present disclosure, and an application server for providing a cross-domain call service.

According to a sixth aspect, there is provided an electronic device, including: at least one processor; and a memory communicatively connected to the at least one processor, wherein the memory stores instructions executable by the at least one processor, and the instructions, when executed by the at least one processor, cause the at least one processor to perform the method provided by the present disclosure.

According to a seventh aspect, there is provided a non-instantaneous computer-readable storage medium storing computer instructions, wherein the computer instructions allow a computer to perform the method provided by the present disclosure.

According to an eighth aspect, there is provided a computer program product containing a computer program, wherein the computer program, when executed by a processor, causes the processor to implement the method provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the present solution, and do not constitute a limitation to the present disclosure.

FIG. 3 schematically shows a schematic diagram of a cross-domain authorization option according to the embodiments of the present disclosure.

FIG. 4 schematically shows a schematic diagram of associating a cross-domain authorization policy with an API object of a target application according to the embodiments of the present disclosure.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

At present, a technical architecture of front-end and back-end separation is adopted in product R&D or business system of some projects. In such a technical architecture mode, a cross-domain call service is easy to occur between different terminals or application servers. For example, in this technical architecture mode, XML Http Requests initiated by the front end is prone to a cross-domain call service. When any of a protocol, a domain name and a port number in a URL (Uniform Resource Locator) of a request is different from that in a URL of a target application, the request is a cross-domain request with respect to the target application.

For example, a target web page address is http://www.example.com/dir/page.html, the protocol is http://, the domain name is www.example.com, and the port is 80 (a default port may be omitted). http://v2.example.com/dir/page.html is a non-same-origin webpage with a different domain name from the target webpage, http://www.example.com:81/dir/page.html is a non-same-origin webpage with a different port from the target web page.

Cross-Origin Resource sharing (CORS) is a browser technical specification used to allow a browser in a current network domain to receive an XML Http Request from a cross-domain server, which is a communication mechanism that allows resources in the current network domain to be shared and accessed by applications in other network domains. Formulating a cross-domain authorization policy for a shared resource (i.e. a resource in each domain that is allowed to be accessed by other domains) may effectively block a malicious cross-domain call and ensure a security of a cross-domain call. A rationality and timeliness of the cross-domain authorization policy may affect the security of the cross-domain call service.

In order to achieve a cross-domain call service with a flexible cross-domain policy deployment and a high cross-domain call security, the present disclosure proposes a method of processing a cross-domain authorization, a method of processing a cross-domain call, a platform of processing a cross-domain control, a system of implementing a cross-domain call, an electronic device, a non-instantaneous computer-readable storage medium storing computer instructions, and a computer program product.

Figure 1:
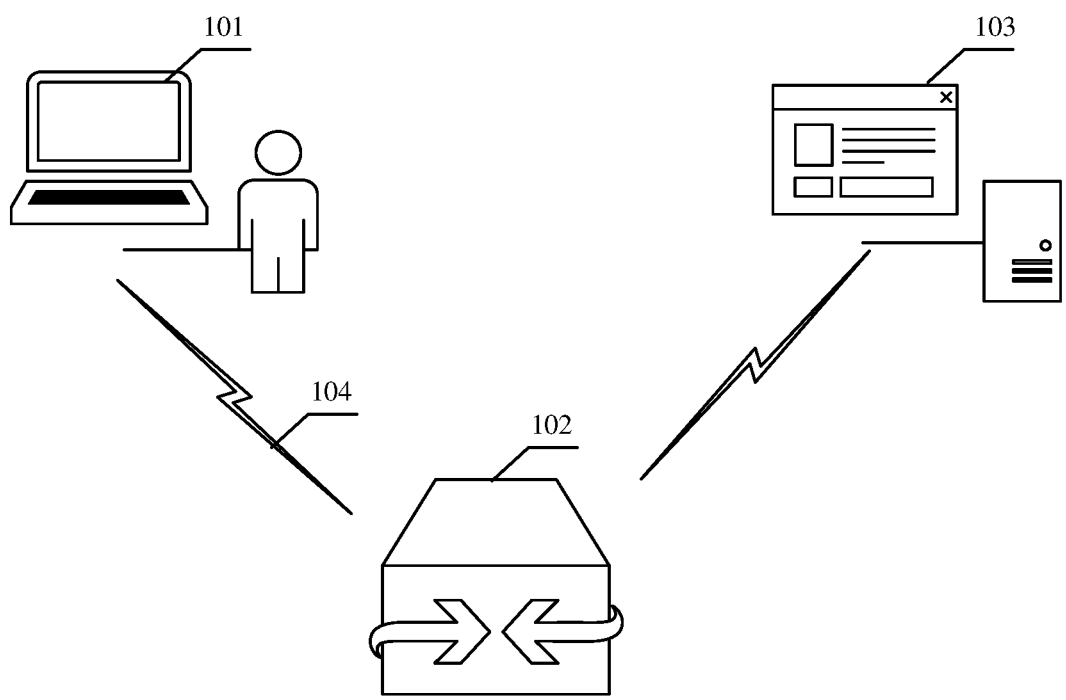
FIG. 1 schematically shows an exemplary business framework of a method and an apparatus of processing a cross-domain call according to the embodiments of the present disclosure.

FIG. 1 schematically shows a schematic diagram of an exemplary business framework of a method and an apparatus of processing a cross-domain call according to the embodiments of the present disclosure. It should be noted that FIG. 1 is only an example of the business system architecture to which the embodiments of the present disclosure may be applied to help those skilled in the art understand the technical content of the present disclosure, but it does not mean that the embodiments of the present disclosure may not be used in other devices, systems, environments or scenarios.

As shown in FIG. 1, a business framework 100 of this embodiment may include a requester 101, a cross-domain control processing platform 102, an application server 103, and a network 104. The network 104 is a medium for providing a communication link between the requester 101, the cross-domain control processing platform 102 and the application server 103. The network 104 may include various connection types, such as wired, wireless communication links, or optical fiber cables. The application server 103 may be an independent physical server, a server cluster or distributed system including a plurality of physical servers, or a cloud server providing basic cloud computing services such as cloud service, cloud computing, network service, middleware service, etc.

The cross-domain control processing platform 102 receives a cross-domain call request from the requester (such as the requester 101 in FIG. 1), and the cross-domain call request indicates a target application that the requester requests to call (for example, an application implemented by the application server 103 in FIG. 1). The requester and the target application may belong to different network domains, that is, the requester 101 and the application server 103 may belong to different network domains. The cross-domain control processing platform 102 acquires a preset cross-domain authorization policy associated with an API (Application Programming Interface) object of the target application. The API object is an interface object for the target application to provide a cross-domain call service. The cross-domain control processing platform 102 determines, according to the cross-domain authorization policy and the cross-domain call request, whether the requester has a cross-domain call permission for the target application. When it is determined that the requester has the cross-domain call permission for the target application, a cross-domain route between the requester and the target application is established, so that the target application may acquire and respond to the cross-domain call request based on the cross-domain route.

Figure 2:
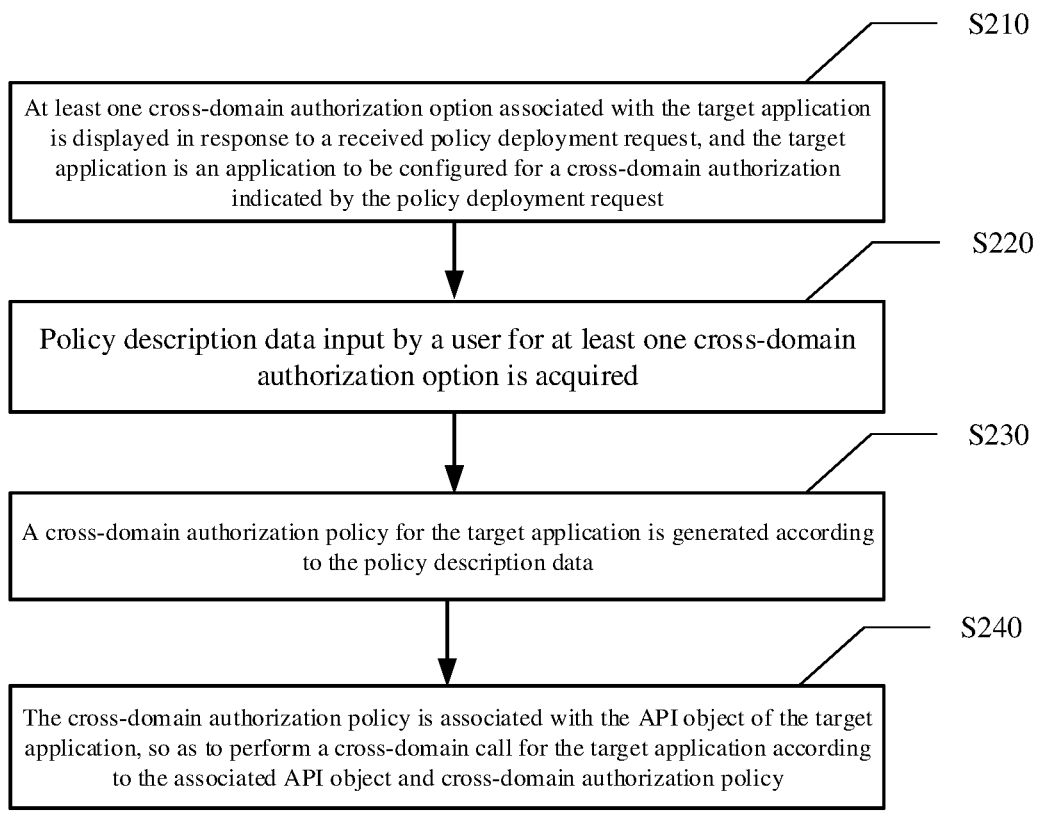
FIG. 2 schematically shows a flowchart of a method of processing a cross-domain authorization according to the embodiments of the present disclosure.

FIG. 2 schematically shows a flowchart of a method of processing a cross-domain authorization according to the embodiments of the present disclosure.

As shown in FIG. 2, a method 200 of processing a cross-domain authorization may include operations S210 to S240.

In operation S210, at least one cross-domain authorization option associated with the target application is displayed in response to a received policy deployment request, and the target application is an application to be configured for a cross-domain authorization indicated by the policy deployment request.

Next, in operation S220, policy description data input by a user for at least one cross-domain authorization option is acquired.

Next, in operation S230, a cross-domain authorization policy for the target application is generated according to the policy description data.

Next, in operation S240, the cross-domain authorization policy is associated with the API object of the target application, so as to perform a cross-domain call for the target application according to the associated API object and cross-domain authorization policy.

An example flow of various steps of the method of processing the cross-domain authorization of this embodiment will be described in detail below.

In operation S210, at least one cross-domain authorization option associated with the target application is displayed in response to the received policy deployment request, and the target application is an application to be configured for a cross-domain authorization indicated by the policy deployment request.

In this embodiment, the policy deployment request from the requester is received, and the policy deployment request indicates the target application to be configured for the cross-domain authorization. The policy deployment request indicates that the requester requests to deploy a cross-domain authorization policy for the target application. The cross-domain authorization policy describes a call authorization rule when an application of other network domains calls a shared resource information in the target application across domains. The requester initiating the policy deployment request may be an API management user of the API object associated with the target application. The API object is an application programming interface object for the target application to provide the cross-domain call service. The API object encapsulates underlying API functions.

The API object includes a calling API object and a called API object. Different API objects may be used to achieve different functions, such as a remote procedure call, a file transfer, an information coupling, a standard language query, etc. Therefore, the target application may correspond to more than one API objects. According to preset API object function and API object call relationship, the target application may provide the cross-domain call service to an application in other network domains based on at least one API object.

In response to the received policy deployment request, at least one cross-domain authorization option associated with the target application may be displayed. The cross-domain authorization option is used to configure a cross-domain call permission associated with the target application. FIG. 3 schematically shows a schematic diagram of a cross-domain authorization option according to the embodiments of the present disclosure. As shown in FIG. 3, the cross-domain authorization option may include, for example, a cross-domain policy name, a cross-domain policy description, a cross-domain delivery option, an allowed request source, an allowed request method, an allowed request header, an exposed request header, a pre-check time, and the like.

For example, the cross-domain policy description is not required, which indicates a role of the cross-domain authorization policy. The cross-domain delivery option indicates whether the cross-domain call service needs to transmit a cookie content. The cookie is data stored in a user's local terminal by a website to identify a user identity and track a session (time domain). An example format of cookie is as follows:

Set-cookie:"Name=value; domain=.domain.com; path=/; expires=time; Http Only; secure"

where Name indicates a uniquely determined cookie name, and value is a string value stored in cookie; domain indicates a domain object for which the cookie is valid, that is, a request transmitted to the domain needs to contain this cookie; path indicates an action path of the cookie, and a browser may transmit a cookie message to a specified domain based on the action path; expires indicates an expiration time of the cookie; secure forms a security flag of the cookie.

According to the embodiment of the present disclosure, an allowed request source indicates a cross-domain call request source that the target application allows to access; a permission request method indicates an HTTP request type supported by the cross-domain call service provided by the target application; an allowed request header indicates a request header information that is allowed to be transmitted from the API object to the target application; an exposed request header indicates a request header information that is allowed to be transmitted by the target application to the API object and further transmitted by the API object to the requester; a pre-check time indicates a time period information of transmitting the received cross-domain call request to the target application for a security authentication. Whether the requester has a cross-domain call request permission for the target application may be determined according to a policy configuration parameter for the allowed request header option; whether the target application has a cross-domain call response permission for the requester may be determined according to a policy configuration parameter for the exposed request header option. In addition, to simplify a cross-domain policy configuration process, the cross-domain control processing platform integrates a default configuration information, which is a default basic information that is not exposed to the user, such as a default allowed request header information and a default exposed request header information.

Next, in operation S220, policy description data input by the user for at least one cross-domain authorization option is acquired.

In this embodiment, the policy description data input by the user for at least one cross-domain authorization option is acquired, that is, the policy description data input by the API management user for each cross-domain authorization option is acquired. The policy description data is metadata used to generate the cross-domain authorization policy associated with the target application. For example, the target application belongs to the network domain of www.qcloud.com, the policy description data input by the API management user for the "allowed request source" option is apigw.qcloud.com, that is, the HTTP request originating from the network domain "apigw.qcloud.com" is allowed to call resources across domains from the target application of the network domain "www.qcloud.com".

The API management user may configure the policy description data for different cross-domain authorization options, and may complete the configuration of the policy description data by submitting a form. Through a unified and flexible management of resource information in a target network domain, this design is conducive to achieving the autonomy and flexibility of cross-domain authorization policy configuration, and ensuring the security of cross-domain call resource information on the basis of meeting a customized requirement of a resource management.

Next, in operation S230, a cross-domain authorization policy for the target application is generated according to the policy description data.

In this embodiment, the cross-domain authorization policy for the target application is generated according to the acquired policy description data associated with each cross-domain authorization option. The generated cross-domain authorization policy supports modification and deletion. An entity form of the cross-domain authorization policy may be a cross-domain authorization policy file in the form of an xml document, for example, crossdomain.xml file that contains cross-domain-policy root element. The root element is a policy definition container in the cross-domain authorization policy file.

Next, in operation S240, the cross-domain authorization policy is associated with the API object of the target application, so as to perform a cross-domain call for the target application according to the associated API object and cross-domain authorization policy.

In this embodiment, FIG. 4 schematically shows a schematic diagram of associating the cross-domain authorization policy with the API object of the target application according to the embodiments of the present disclosure. By associating the cross-domain authorization policy with the API object of the target application, the cross-domain authorization policy for the target application may be managed based on an API object level. Compared with a related art in which the cross-domain authorization policy is managed based on an application level, this design may effectively reduce a granularity of a cross-domain authorization policy management and improve a refinement of a cross-domain call control.

According to the embodiments of the present disclosure, the cross-domain control processing platform may provide an API scanning function, which may display the API object associated with the target application according to a scanning condition set by the user. The cross-domain authorization policy associated with the target application may be managed in the form of a plug-in. During the cross-domain call control, the cross-domain authorization policy may be bound with a specific API object of the target application according to an actual cross-domain call need, so as to achieve an association management between the cross-domain authorization policy and the API object of the target application. When the cross-domain authorization policy is associated with the API object of the target application, there is no functional coupling between the cross-domain authorization policy and the API object, and their underlying data may not be merged. The decoupling relationship between the cross-domain authorization policy and the API object is conducive to achieving a more refined and flexible cross-domain call control, and may be well applied to a micro service application environment with rich application scenarios. The micro service application is an implementation form of developing a single application by building a plurality of independent functional units (i.e., services). Each functional unit may run independently in its own process, and a data exchange between different functional units is performed through lightweight communication. The micro service application has advantages of good scalability, high reliability and low maintenance cost.

After generating the cross-domain authorization policy for the target application, a binding operation between the cross-domain authorization policy and the API object of the target application may be performed. The API object associated with the target application is set with a preset call attribute, which may include, for example, an authentication method, an access protocol type, an allowed request method type, a request format, a service interface address and other information. Since both the cross-domain authorization policy and the preset call attribute may contain a call parameter information for the API object, a policy conflict may exist between the cross-domain authorization policy and the preset call attribute of the API object.

At least one API object associated with the target application may include some API objects of which the preset call attributes have no policy conflict with the cross-domain authorization policy, and may also include some API objects of which the preset call attributes have a policy conflict with the cross-domain authorization policy. The API objects of which the preset call attributes have a policy conflict with the cross-domain authorization policy may contain an API object that allows a conflict elimination. For ease of expression, the API objects of which the preset call attributes have no policy conflict with the cross-domain authorization policy may be expressed as a first API object, the API objects of which the preset call attributes have a policy conflict with the cross-domain authorization policy may be expressed as a second API object, and the API object in the second API object after conflict elimination may be expressed as a third API object.

As shown in FIG. 4, when associating the cross-domain authorization policy with the API object of the target application, for at least one API object associated with the target application, whether a policy conflict exists between the cross-domain authorization policy and a preset call attribute of each API object in the at least one API object may be determined according to the preset call attribute of each API object in the at least one API object. For at least one first API object without policy conflict, an association operation between the cross-domain authorization policy and each first API object is performed. For at least one second API object with policy conflict, it is determined whether a conflict elimination may be performed for the preset call attribute of each second API object; and an association operation between the cross-domain authorization policy and each third API object in the at least one third API object after the conflict elimination is performed for the at least one third API object after the conflict elimination. For example, the conflict elimination may include, when it is determined that the policy conflict exists between the cross-domain authorization policy and the preset call attribute of any API object, re-formulating the preset call attribute of the API object according to the business requirement and the API object function, so as to eliminate the policy conflict. Those skilled in the art may understand that the conflict elimination may be achieved using other methods, which are not limited in the embodiments of the present disclosure.

The cross-domain authorization policy for the target application supports modification and deletion. At least one configured cross-domain authorization option associated with the target application may be displayed in response to a received policy change request for the target application. Then, policy change data input by the user for the at least one configured cross-domain authorization option is acquired, and the cross-domain authorization policy for the target application is updated according to the policy change data. The updated cross-domain authorization policy is associated with the API object of the target application, so as to perform a cross-domain call for the target application according to the associated API object and updated cross-domain authorization policy. Compared with the related art in which the cross-domain authorization policy for the shared resource is maintained in the form of configuring a templated code, this design may effectively reduce an update cost of the cross-domain authorization policy, improve a revision convenience of the cross-domain authorization policy, and effectively ensure the timeliness and rationality of the cross-domain authorization policy configuration.

Optionally, in order to achieve a fine control of the cross-domain call service, a flow control parameter associated with the API object may be configured, so as to perform the cross-domain call for the target application according to the flow control parameter and the cross-domain authorization policy. The flow control parameter indicates a cross-domain call request threshold that the API object allows to access within a unit time. For example, the flow control parameter may include an external call limit (in unit of times/second) and an internal call limit (in unit of times/second). In addition, a cross-domain enable parameter associated with the API object may be further configured, so that the cross-domain call for the target application is performed according to the cross-domain enable parameter and the cross-domain authorization policy. The cross-domain enable parameter indicates whether the API object allows enabling the cross-domain call service.

According to the embodiments of the present disclosure, at least one cross-domain authorization option associated with the target application may be displayed in response to a received policy deployment request. The target application is an application to be configured for the cross-domain authorization indicated by the policy deployment request. The policy description data input by the user for at least one cross-domain authorization option is acquired, the cross-domain authorization policy for the target application is generated according to the policy description data, and the cross-domain authorization policy is associated with the application programming interface API object of the target application, so that the cross-domain call for the target application is performed according to the associated API object and cross-domain authorization policy. By displaying at least one cross-domain authorization option associated with the target application, acquiring the policy description data input by the user for at least one cross-domain authorization option, generating a cross-domain authorization policy for the target application according to the policy description data, and associating the cross-domain authorization policy with the API object of the target application, this design may effectively control the configuration cost and update cost of the cross-domain authorization policy, improve a merging efficiency and revision convenience of the cross-domain authorization policy, and help to ensure the timeliness and rationality of the cross-domain authorization policy. In addition, maintaining the cross-domain authorization policy for the target application based on the API object level is conducive to improving the refinement of the cross-domain call control, improving the security of information resource sharing between different network domains, and achieving a safe and efficient cross-domain resource sharing mechanism.

Figure 5:
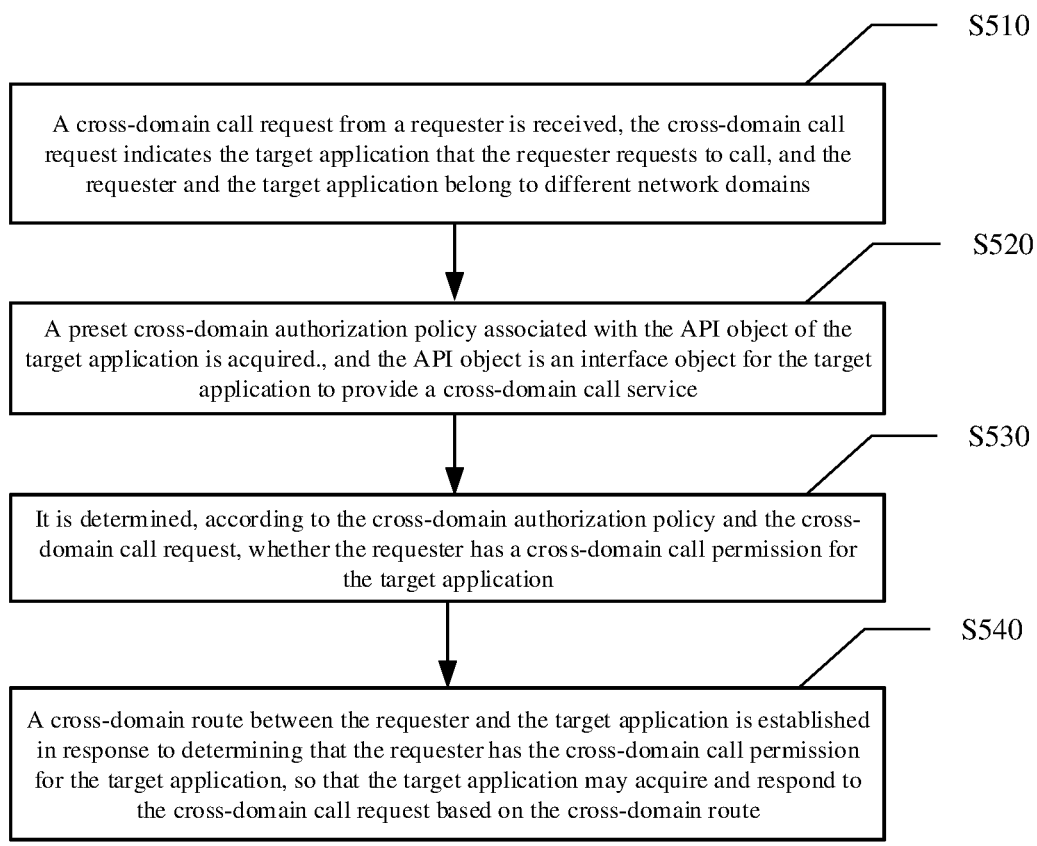
FIG. 5 schematically shows a method of processing a cross-domain call according to the embodiments of the present disclosure.

FIG. 5 schematically shows a method of processing a cross-domain call according to the embodiments of the present disclosure.

As shown in FIG. 5, a method 500 of processing a cross-domain call may include operations S510 to S540.

In operation S510, a cross-domain call request from a requester is received. The cross-domain call request indicates the target application that the requester requests to call, and the requester and the target application belong to different network domains.

Next, in operation S520, a preset cross-domain authorization policy associated with the API object of the target application is acquired. The API object is an interface object for the target application to provide a cross-domain call service.

Next, in operation S530, it is determined, according to the cross-domain authorization policy and the cross-domain call request, whether the requester has a cross-domain call permission for the target application.

Next, in operation S540, a cross-domain route between the requester and the target application is established in response to determining that the requester has the cross-domain call permission for the target application, so that the target application may acquire and respond to the cross-domain call request based on the cross-domain route.

An example flow of various step of the method of processing the cross-domain call of this embodiment will be described in detail below.

In operation S510, a cross-domain call request is received from the requester. The cross-domain call request indicates the target application that the requester requests to call, and the requester and the target application belong to different network domains.

In this embodiment, the cross-domain call request is received from the requester, and the cross-domain call request indicates the target application that the requester requests to call across domains. The cross-domain call request from the requester may be a simple cross-domain request or a non-simple cross-domain request. A request method in the simple cross-domain request is one of HEAD method, GET method and POST method, and a request method in the non-simple cross-domain request includes OPTIONS method. The OPTIONS method requests to pre-check whether an actual request for a subsequent cross-domain call may be transmitted safely, by adding an HTTP request prior to a formal communication. For a method for distinguishing the simple cross-domain request from the non-simple cross-domain request, reference may be made to a relevant definition in the related art, and details will not be repeated here in this embodiment.

The cross-domain call request may contain an Origin field, which indicates a cross-domain call request source. For example, the cross-domain call request may contain a field of Host:qcloud.com and a field of Origin: http://apigw.qcloud.com, then the cross-domain call request indicates that apigw.qcloud.com requests to call resources in qcloud.com.

Optionally, the requester and the target application associated with the cross-domain call request may be browsers belonging to different network domains, and the API object associated with the target application may be encapsulated in a browser plug-in or browser component, or may be built in a browser.

Next, in operation S520, a preset cross-domain authorization policy associated with the API object of the target application is acquired. The API object is an interface object for the target application to provide the cross-domain call service.

In this embodiment, for at least one API object associated with the target application, the cross-domain enable parameter associated with each API object is acquired. According to the cross-domain enable parameter associated with each API object, it may be determined whether the corresponding API object allows enabling the cross-domain call service. For at least one API object that allows enabling the cross-domain call service, the cross-domain authorization policy associated with each API object is acquired. Optionally, the cross-domain authorization policy associated with each API object may be acquired from an API database, the cross-domain authorization policy may be saved in a Redis (Remote Dictionary Server) cache, and a preset life cycle length may be set for cached data.

As a feasible way, prior to the acquisition of the cross-domain authorization policy associated with the API object of the target application, a user attribute certificate associated with the requester may be acquired. According to the user attribute certification, it may be determined whether the requester has subscribed to a cross-domain call service for the target application. When it is determined that the requester has subscribed to the cross-domain call service for the target application, an operation of acquiring the cross-domain authorization policy may be performed. The requester needs to subscribe to the cross-domain call service on a management platform in advance as required, so that the management platform may generate a system token and/or AK (Access Key)/SK (Secret Key) authentication key for the requester.

In addition, service contract data associated with the target application may be further acquired. According to the service contract data, it may be determined whether the target application has registered a cross-domain call service associated with the cross-domain call request. When it is determined that the target application has registered the cross-domain call service associated with the cross-domain call request, an operation of acquiring the cross-domain authorization policy may be performed. The target application needs to register the cross-domain call service provided by the target application on the management platform in advance as required, otherwise the cross-domain call service may not be performed based on the API call. This design may eliminate a need for the cross-domain call service provider to repeatedly apply for the cross-domain call service, and does not require the provider to independently perform a cumbersome operation of cross-domain call load balancing, which is conducive to improving the convenience of cross-domain call service API calls.

Next, in operation S530, it is determined, according to the cross-domain authorization policy and the cross-domain call request, whether the requester has a cross-domain call permission for the target application.

In this embodiment, the cross-domain call request contains a call interface information associated with the requester and a call type information associated with the requester. The call interface information may be, for example, a call interface address information indicated by the Origin field, and the call type information may be, for example, a request method type information in the cross-domain call request. The request method may include, for example, POST, GET, PUT, DELETE and other method types.

When determining whether the requester has the cross-domain call permission for the target application according to the cross-domain authorization policy and the cross-domain call request, it may be determined, according to the cross-domain authorization policy associated with the API object as well as the call interface information and the call type information in the cross-domain call request, whether the requester has the cross-domain call request permission for the target application, and it may be determined whether the target application has a cross-domain call response permission for the requester. When it is determined that the requester has the cross-domain call request permission for the target application and the target application has the cross-domain call response permission for the requester, it is determined that the requester has the permission to perform a cross-domain call for the target application through the API object. For example, it may be determined whether the requester has the cross-domain call request permission for the target application, according to the cross-domain call request and according to the allowed request source, allowed request method, and allowed request header information in the cross-domain authorization policy; and it may be determined whether the target application has the cross-domain call response permission for the requester, according to the exposed request header information in the cross-domain authorization policy.

When the received cross-domain call request is a non-simple cross-domain request, the non-simple cross-domain request needs to be firstly transmitted in the form of a pre-check request to the target application for a pre-check verification. If the pre-check verification passes, the non-simple cross-domain request may be transmitted in the form of a formal request to the target application for response. In addition, when the pre-check verification passes, according to a time period indicated by a pre-check time feature in the cross-domain authorization policy, the non-simple cross-domain request received from the same requester in the corresponding time period is directly processed as a simple cross-domain request. Therefore, as a feasible way, after determining that the requester has a permission to call the target application across domains through the API object, it may be further determined, according to the pre-check time feature in the cross-domain authorization policy, whether to transmit the cross-domain call request to the target application through the API object so that the target application may determine, according to the cross-domain call request, whether to allow a current cross-domain call.

Next, in operation S540, when it is determined that the requester has the cross-domain call permission for the target application, a cross-domain route between the requester and the target application is established so that the target application may acquire and respond to the cross-domain call request based on the cross-domain route.

In this embodiment, when it is determined that the requester has the permission to call the target application across domains through M API objects, a network performance information of M cross-domain routes formed by the requester and each API object in the M API objects may be determined when establishing the cross-domain route between the requester and the target application. The network performance information indicates a network performance of the corresponding cross-domain route. Then, a cross-domain route with the best network performance is selected from the M cross-domain routes as the cross-domain route between the requester and the target application, where M is an integer greater than 1. The network performance information includes a network delay information and/or a network bandwidth information.

The network performance of the cross-domain route formed by the requester and the API object may be indicated by the network delay information and/or the network bandwidth information. The network performance is related to factors such as a support network protocol ability and line speed forwarding ability of the corresponding API object, and also related to a data flow size and data flow rate to be processed by the corresponding API object. N cross-domain routes with the best network performance may be selected from the M cross-domain routes formed by the requester and various API objects, as routing paths for data transmission between network domains, where N is an integer not less than 1.

A cross-domain route between the requester and the target application is established so that the target application may acquire and respond to the cross-domain call request based on the cross-domain route. As a feasible way, the cross-domain call request acquired from the requester is transmitted to the target application through the API object, and/or the cross-domain call response information acquired from the API object is transmitted to the requester. The cross-domain call response information is obtained by the target application responding to the cross-domain call request.

When the cross-domain call request is transmitted to the target application through the API object, the cross-domain authorization policy associated with the API object may be added to the request header of the cross-domain call request, so as to obtain a processed cross-domain call request. Then, the processed cross-domain call request is transmitted to the target application through the API object, so that the target application may extract the cross-domain authorization policy in the request header, and determine, according to the cross-domain authorization policy, whether to allow the current cross-domain call.

As a feasible method, a flow control parameter associated with the API object of the target application may be acquired, and the flow control parameter and the cross-domain authorization policy may be added to the request header of the cross-domain call request, so as to obtain the processed cross-domain call request. Then, the processed cross-domain call request may be transmitted to the target application through the API object, so that the target application may determine, according to the processed cross-domain call request, whether to allow the current cross-domain call. For example, the target application may extract the flow control parameter and the cross-domain authorization policy in the request header, and determine, according to the cross-domain authorization policy and according to an internal call restriction information and an external call restriction information in the flow control parameter, whether to allow the current cross-domain call through the corresponding API object.

According to the embodiments of the present disclosure, a cross-domain call request is received from the requester. The cross-domain call request indicates the target application that the requester requests to call, and the requester and the target application belong to different network domains. The preset cross-domain authorization policy associated with the API object of the target application is acquired. The API object is an interface object for the target application to provide the cross-domain call service. According to the cross-domain authorization policy and the cross-domain call request, it may be determined whether the requester has the cross-domain call permission for the target application. When it is determined that the requester has the cross-domain call permission for the target application, a cross-domain route between the requester and the target application may be established, so that the target application may acquire and respond to the cross-domain call request based on the cross-domain route. The cross-domain call control operation between the requester and the target application is performed according to the cross-domain authorization policy associated with the API object of the target application. In this way, the refinement of the cross-domain call control may be improved while meeting the business requirements according to the customized resource management requirements, so as to ensure the security of the information call between different network domains, which is conductive to the resource sharing between multiple network domains and the unified and flexible management of shared resources in different network domains.

Figure 6:
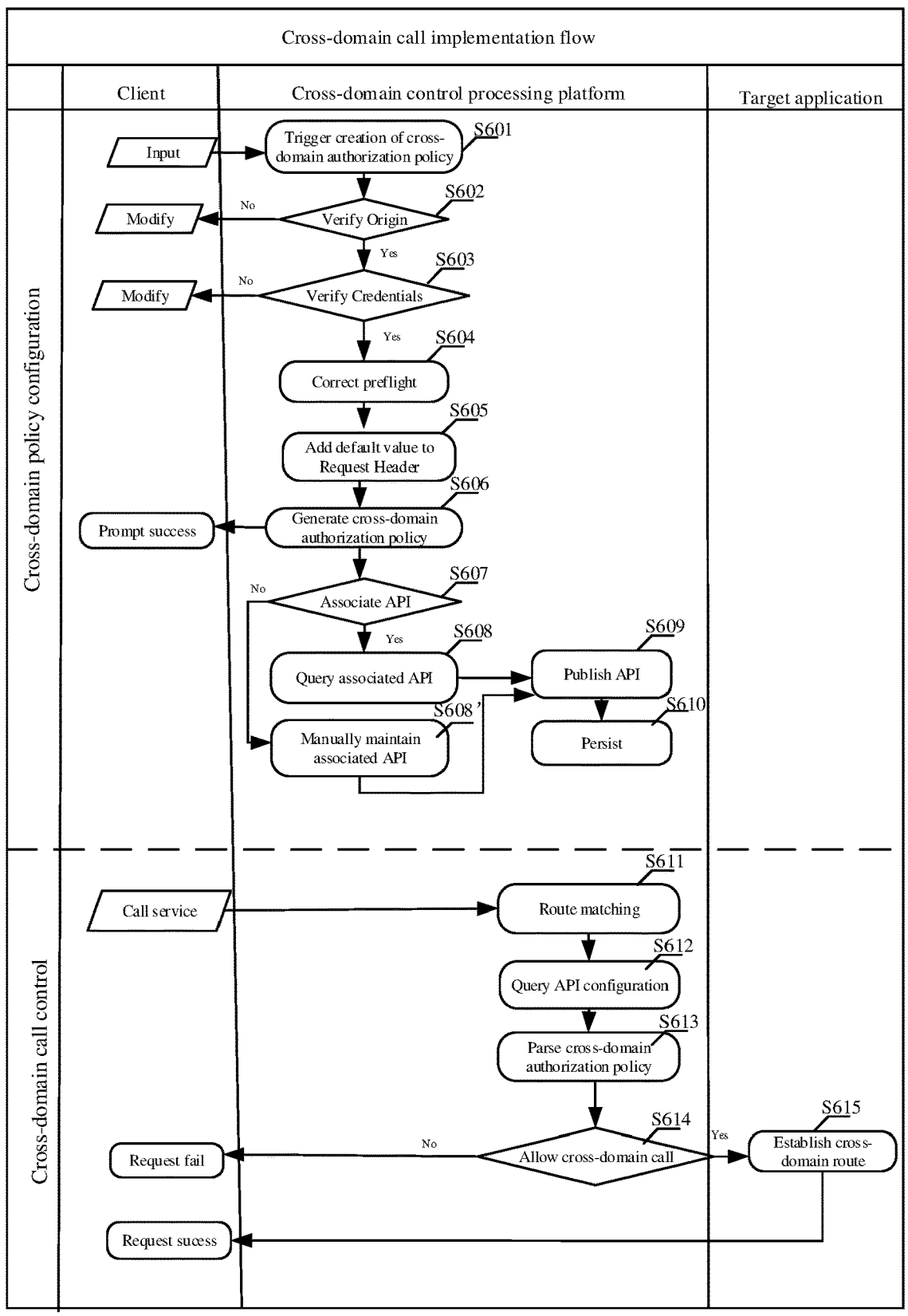
FIG. 6 schematically shows a schematic diagram of a flow of implementing a cross-domain call according to the embodiments of the present disclosure.

FIG. 6 schematically shows a cross-domain call implementation flow according to the embodiments of the present disclosure.

As shown in FIG. 6, the cross-domain call implementation process may include operations S601 to S615.

The cross-domain call implementation flow is executed by a cross-domain call control platform. The cross-domain call implementation flow may include a cross-domain policy configuration flow and a cross-domain call process flow. The cross-domain call control platform may include a micro service application platform and a micro service gateway. The cross-domain policy configuration flow is executed by the micro service application platform, and the cross-domain policy configuration flow may include operations S601 to S610. The cross-domain call process flow is executed by the micro service gateway, and the cross-domain call process flow may include operations S601 to S615.

Operations S601 to S610 are performed in the cross-domain policy configuration flow.

In operation S601, a cross-domain authorization policy creation event is triggered in response to the received policy deployment request.

In an example, in response to the received policy deployment request, at least one cross-domain authorization option associated with the target application is displayed, and the policy description data input by the user for at least one cross-domain authorization option is acquired. The target application is an application to be configured for the cross-domain authorization indicated by the policy deployment request.

Next, in operation S602, it is verified whether the acquired policy description data contains the Origin field. If so, operation S603 is performed. If not, the policy description data is returned to the client for modification. The Origin field indicates an allowed cross-domain call request source.

Next, in operation S603, it is verified whether the acquired policy description data contains Credentials field. If so, operation S604 is performed. If not, the policy description data is returned to the client for modification. The Credentials field indicates whether the cross-domain call service needs to transmit the cookie content.

Next, in operation S604, preflight (pre-check time) is corrected. The pre-check time indicates a time period information for transmitting the received cross-domain call request to the target application for security authentication.

Next, in operation S605, a default value of Request Header field is added. The Request Header field indicates a request header information required to be contained in the cross-domain call request.

Next, in operation S606, a cross-domain authorization policy is generated according to the acquired policy description data.

Next, in operation S607, it is determined whether the cross-domain authorization policy has been associated with the API object of the target application. If so, operation S608 is performed. If not, operation S608' is performed.

In operation S608, all API objects associated with the cross-domain authorization policy are queried.

In operation S608', the cross-domain authorization policy is manually associated with the API object of the target application.

Subsequent to operation S608 and operation S608', operation S609 is performed to publish an API object information.

Next, in operation S610, the cross-domain authorization policy associated with the API object is persisted.

Operations S611 to S615 are performed in the cross-domain call process flow.

In operation S611, in response to the received cross-domain call request from the requester, a route matching between the requester and the target application is performed to determine the API object that may be used to implement the cross-domain call service. The cross-domain call request indicates the target application that the requester requests to call.

Next, in operation S612, an API object configuration information is queried to acquire the cross-domain authorization policy associated with the API object.

Next, in operation S613, the cross-domain authorization policy associated with the API object is parsed.

Next, in operation S614, it is determined, according to the received cross-domain call request and the cross-domain authorization policy associated with the API object, whether to allow the current cross-domain call of the requester. If so, operation S615 is performed. If not, a prompt of request failure is returned to the requester.

Next, in operation S615, a cross-domain route between the requester and the target application is established so that the target application provides a cross-domain call service based on the cross-domain route.

Figure 7:
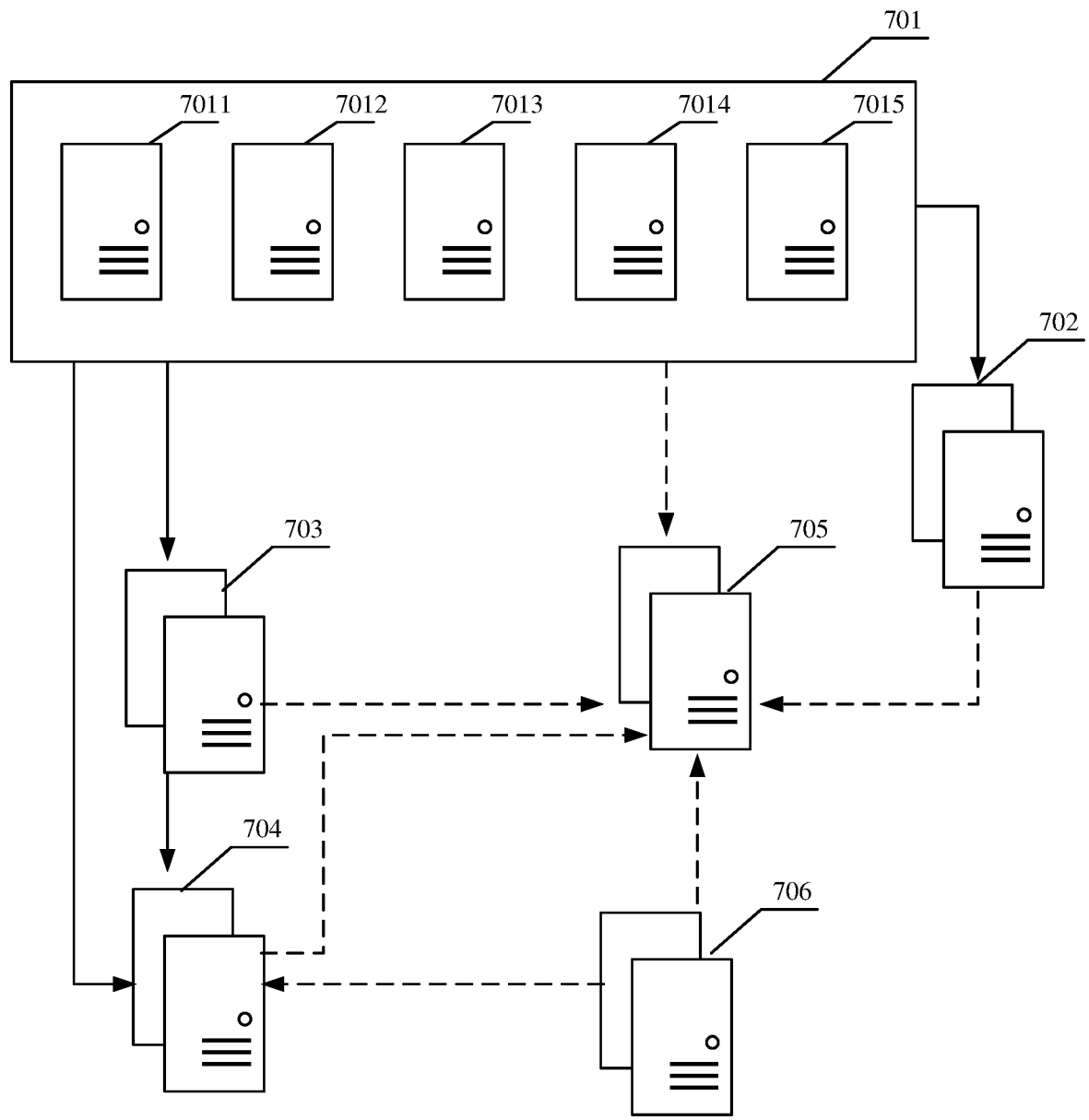
FIG. 7 schematically shows a schematic diagram of a system of implementing a cross-domain call according to the embodiments of the present disclosure.

FIG. 7 schematically shows a schematic diagram of a system of implementing a cross-domain call according to the embodiments of the present disclosure.

As shown in FIG. 7, the system of implementing the cross-domain call may include a cross-domain control processing platform 701, a message service cluster 702, a cache server 703, a storage server 704, a monitoring server 705, and a failover server 706.

The cross-domain control processing platform 701 includes component application clusters of the micro service platform, which are used for cross-domain authorization policy configuration and cross-domain call service transfer. The cross-domain control processing platform 701 includes a gateway 7011, a registration center 7012, an authentication center 7013, a micro service application 7014 and a configuration center 7015.

Since the cross-domain call service is a service that is not directly exposed to the requester, the requester needs to transmit a cross-domain call request to the gateway 7011. The gateway 7011 records details of the cross-domain call request, such as a request header and request body information in the cross-domain call request. The gateway 7011 acquires the cross-domain authorization policy associated with the API object of the target application through a custom plug-in, and determines whether to allow the current cross-domain call of the requester according to the acquired cross-domain authorization policy and cross-domain call request. When it is determined that the current cross-domain call is allowed, the gateway 7011 transmits the cross-domain call request to the target application in the form of a transit platform, receives the cross-domain call response information from the target application, and records the response header and response body information in the cross-domain call response information.

The registration center 7012 is used for the target application to register the cross-domain call service provided by the target application.

The authentication center 7013 is used to authenticate, according to a user attribute certificate of the requester, whether the requester has subscribed to the cross-domain call service associated with the target application.

The micro service application 7014 is used to perform the cross-domain authorization policy configuration. A policy configuration function may be achieved in the form of a form submitted by the user.

The configuration center 7015 is used to provide the default basic information of cross-domain authorization policy configuration. The user may easily introduce the default basic information into its own service configuration, so that most of the repetitive configuration content may be eliminated, and the policy configuration function may be online transparent and easy to maintain.

The message service cluster 702 is used to acquire and store a log record during the cross-domain call.

The cache server 703 may be a Redis server used to cache some infrequently changed data during cross-domain call, for example, used to temporarily cache the cross-domain authorization policy after acquiring the cross-domain authorization policy associated with the API object.

The storage server 704 may be a MySQL (relational database management system) server, which is used to persistently store the data during the cross-domain call.

The monitoring server 705 may be a Zabbix monitoring server, which is used to monitor a virtual machine status of the entire platform and issue an abnormal alarm.

The failover server 706 may be an MHA server, which is used as a MySQL management tool to maintain a high availability architecture that supports MySQL.

Figure 8:
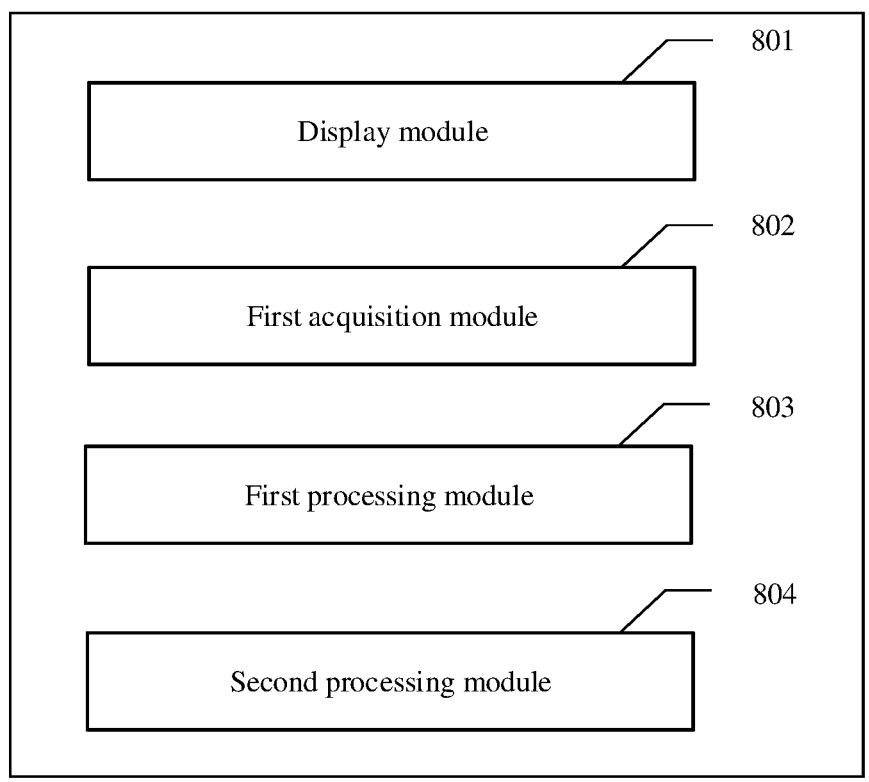
FIG. 8 schematically shows a schematic diagram of a platform of processing a cross-domain control according to the embodiments of the present disclosure.

FIG. 8 schematically shows a schematic diagram of a platform of processing a cross-domain control according to the embodiments of the present disclosure.

As shown in FIG. 8, the platform of processing the cross-domain control includes a display module 801, a first acquisition module 802, a first processing module 803, and a second processing module 804.

The display module 801 is used to display, in response to a received policy deployment request, at least one crossdomain authorization option associated with the target application. The target application is an application to be configured for cross-domain authorization indicated by the policy deployment request. The first acquisition module 802 is used to acquire policy description data input by a user for at least one cross-domain authorization option. The first processing module 803 is used to generate a cross-domain authorization policy for the target application according to the policy description data. The second processing module 804 is used to associate the cross-domain authorization policy with an application programming interface API object of the target application, so as to perform a cross-domain call for the target application according to the associated API object and cross-domain authorization policy.

According to the embodiments of the present disclosure, at least one cross-domain authorization option associated with the target application is displayed in response to the received policy deployment request. The target application is an application to be configured for cross-domain authorization indicated by the policy deployment request. The policy description data input by the user for at least one cross-domain authorization option is acquired. The cross-domain authorization policy for the target application is generated according to the policy description data. The cross-domain authorization policy is associated with the application programming interface API object of the target application, so as to perform a cross-domain call for the target application according to the associated API object and cross-domain authorization policy. By displaying at least one cross-domain authorization option associated with the target application, acquiring the policy description data input by the user for at least one cross-domain authorization option, generating a cross-domain authorization policy for the target application according to the policy description data, and associating the cross-domain authorization policy with the API object of the target application, this design may effectively control the configuration cost and update cost of the cross-domain authorization policy, improve the convenience of revision of the cross-domain authorization policy, and help to ensure the timeliness and rationality of the cross-domain authorization policy. In addition, maintaining the cross-domain authorization policy for the target application based on the API object level is conducive to improving the refinement of the cross-domain call control and improving the security of information resource sharing between different network domains.

As a feasible method, the second processing module includes: a first processing sub-module used to determine, for at least one API object associated with the target application, whether a policy conflict exists between the cross-domain authorization policy and a preset call attribute of the at least one API object. The second processing sub-module is used to perform, for at least one first API object without policy conflict, an association operation between the cross-domain authorization policy and each first API object.

As a feasible method, the second processing module further includes: a third processing sub-module used to determine, for at least one second API object with policy conflict, whether a conflict elimination may be performed on the preset call attribute of each second API object; and a fourth processing sub-module used to perform, for at least one third API object after the conflict elimination, an association operation between the cross-domain authorization policy and each third API object.

As a feasible method, the platform of processing the cross-domain control further includes a fifth processing module used to: display, in response to the received policy change request for the target application at least one configured cross-domain authorization option associated with the target application; acquire the policy change data input by the user for at least one configured cross-domain authorization option; update the cross-domain authorization policy for the target application according to the policy change data; and associate the updated cross-domain authorization policy with the API object of the target application, so as to perform a cross-domain call for the target application according to the associated API object and updated cross-domain authorization policy.

As a feasible method, the platform of processing the cross-domain control further includes a sixth processing module used to configure a flow control parameter associated with the API object, so as to perform the cross-domain call for the target application according to the flow control parameter and the cross-domain authorization policy. The flow control parameter indicates the cross-domain call request threshold that the API object allows to access within a unit time.

As a feasible method, the platform of processing the cross-domain control further includes a seventh processing module used to configure a cross-domain enable parameter associated with the API object, so as to perform a cross-domain call for the target application according to the cross-domain enable parameter and the cross-domain authorization policy. The cross-domain enable parameter indicates whether the API object allows enabling the cross-domain call service.

Figure 9:
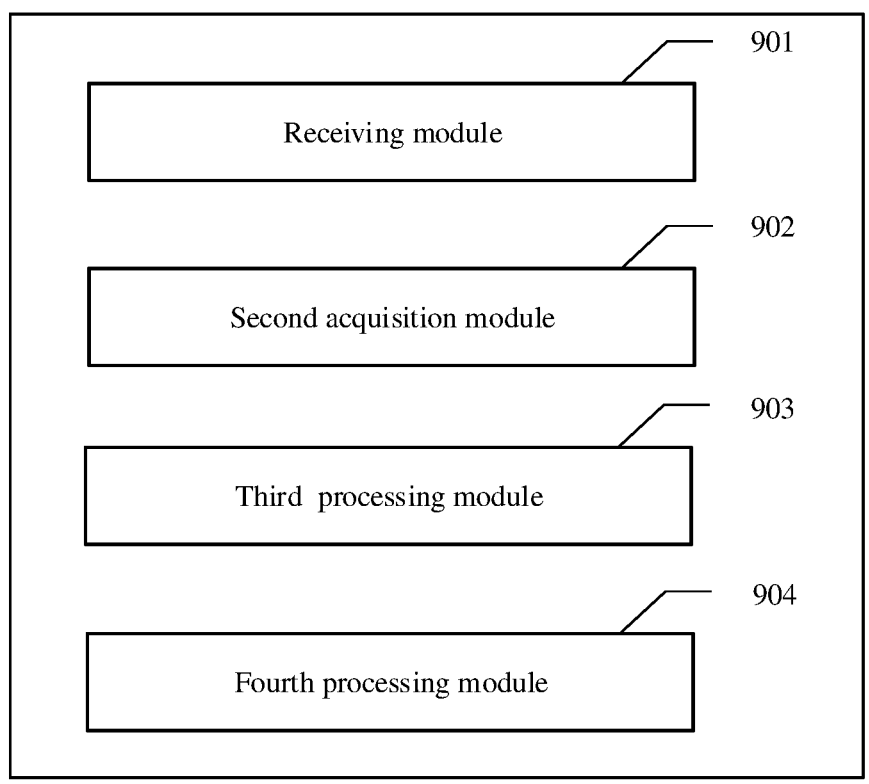
FIG. 9 schematically shows a schematic diagram of another platform of processing a cross-domain control according to the embodiments of the present disclosure.

FIG. 9 schematically shows another platform of processing a cross-domain control according to the embodiments of the present disclosure.

As shown in FIG. 9, the platform of processing the cross-domain control includes a receiving module 901, a second acquisition module 902, a third processing module 903, and a fourth processing module 904.

The receiving module 901 is used to receive a cross-domain call request from the requester. The cross-domain all request indicates the target application that the requester requests to call, and the requester and the target application belong to different network domains. The second acquisition module 902 is used to acquire a preset cross-domain authorization policy associated with the API object of the target application. The API object is an interface object for the target application to provide the cross-domain call service. The third processing module 903 determines whether the requester has the cross-domain call permission for the target application according to the cross-domain authorization policy and the cross-domain call request. The fourth processing module 904 is used to establish a cross-domain route between the requester and the target application when it is determined that the requester has the cross-domain call permission for the target application, so that the target application may acquire and respond to the cross-domain call request based on the cross-domain route.

According to the embodiments of the present disclosure, the cross-domain call request is received from the requester, the cross-domain call request indicates the target application that the requester requests to call, and the requester and the target application belong to different network domains. The preset cross-domain authorization policy associated with the API object of the target application is acquired, and the API object is the interface object used for the target application to provide the cross-domain call service. According to the cross-domain authorization policy and the cross-domain call request, it is determined whether the requester has the cross-domain call permission for the target application. The cross-domain route between the requester and the target application is established when it is determined that the requester has the cross-domain call permission for the target application, so that the target application may acquire and respond to the cross-domain call request based on the cross-domain route. The cross-domain call control operation between the requester and the target application may be performed according to the cross-domain authorization policy associated with the API object of the target application. In this way, the refinement of the cross-domain call control may be improved while meeting the business requirements according to the customized resource management requirements, so as to ensure the security of information calls between different network domains, which is conductive to achieving the resource sharing between multiple network domains and the unified and flexible management of shared resources in different network domains.

As a feasible method, the second acquisition module includes: a first acquisition sub-module used to acquire, for at least one API object associated with the target application, a cross-domain enable parameter associated with each API object; a fifth processing sub-module used to determine, according to the cross-domain enable parameter associated with each API object, whether the API object allows enabling the cross-domain call services; and a sixth processing sub-module used to acquire, for at least one API object that allows enabling the cross-domain call service, a cross-domain authorization policy associated with each API object.

As a feasible method, the cross-domain call request contains a call interface information associated with the requester and a call type information associated with the requester. The third processing module includes: a seventh processing sub-module used to determine, according to the cross-domain authorization policy associated with the API object as well as the call interface information and the call type information in the cross-domain call request, whether the requester has the cross-domain call request permission for the target application and whether the target application has the cross-domain call response permission for the requester; and an eighth processing sub-module used to determine that the requester has the permission to call the target application across domains through the API object when it is determined that the requester has the cross-domain call request permission for the target application and the target application has the cross-domain call response permission for the requester.

As a feasible method, when it is determined that the requester has the permission to call the target application across domains through M API objects, the fourth processing module includes: a ninth processing sub-module used to determine a network performance information of M cross-domain routes formed by the requester and each API object in the M API objects, where the network performance information indicates a network performance of the corresponding cross-domain route; a tenth processing sub-module used to select a cross-domain route with the best network performance from the M cross-domain routes as the cross-domain route between the requester and the target application, where M is an integer greater than 1. The network performance information includes a network delay information and/or a network bandwidth information.

As a feasible method, the fourth processing module further includes: an eleventh processing sub-module used to transmit the cross-domain call request to the target application through the API object; a twelfth processing sub-module used to transmit the cross-domain call response information acquired from the API object to the requester. The cross-domain call response information is obtained by the target application responding to the cross-domain call request.

As a feasible method, the eleventh processing sub-module includes: a first processing unit used to add the cross-domain authorization policy associated with the API object to the request header of the cross-domain call request, so as to obtain the processed cross-domain call request; a second processing unit used to transmit the processed cross-domain call request to the target application through the API object, so that the target application may determine, according to the processed cross-domain call request, whether to allow the current cross-domain call.

As a feasible method, the eleventh processing sub-module further includes: a third processing unit used to acquire a flow control parameter associated with the API object of the target application, and add the cross-domain authorization policy and the flow control parameter associated with the API object to the request header of the cross-domain call request, so as to obtain the processed cross-domain call request; a fourth processing unit used to transmit the processed cross-domain call request to the target application through the API object, so that the target application may determine, according to the processed cross-domain call request, whether to allow the current cross-domain call.

As a feasible method, the platform of processing the cross-domain control further includes an eighth processing module used to: acquire a user attribute certificate associated with the requester; determine, according to the user attribute certificate, whether the requester has subscribed to the cross-domain call service for the target application; and trigger the second acquisition module to perform the operation of acquiring the cross-domain authorization policy when it is determined that the requester has subscribed to the cross-domain call service for the target application.

As a feasible method, the platform of processing the cross-domain control further includes: a ninth processing module used to: acquire service contract data associated with the target application; determine, according to the service contract data, whether the target application has registered the cross-domain call service associated with the cross-domain call request; and trigger the second acquisition module to perform the operation of acquiring the cross-domain authorization policy when it is determined that the target application has registered the cross-domain call service associated with the cross-domain call request.

As a feasible method, the platform of processing the cross-domain control further includes: a tenth processing module used to determine, according to a pre-check time feature in the cross-domain authorization policy, whether to transmit the cross-domain call request to the target application through the API object, so that the target application may determine, according to the cross-domain call request, whether to allow the current cross-domain call.

As a feasible method, the requester and the target application are browsers belonging to different network domains. The API object is encapsulated in a browser plug-in or browser component, or built into a browser.

Figure 10:
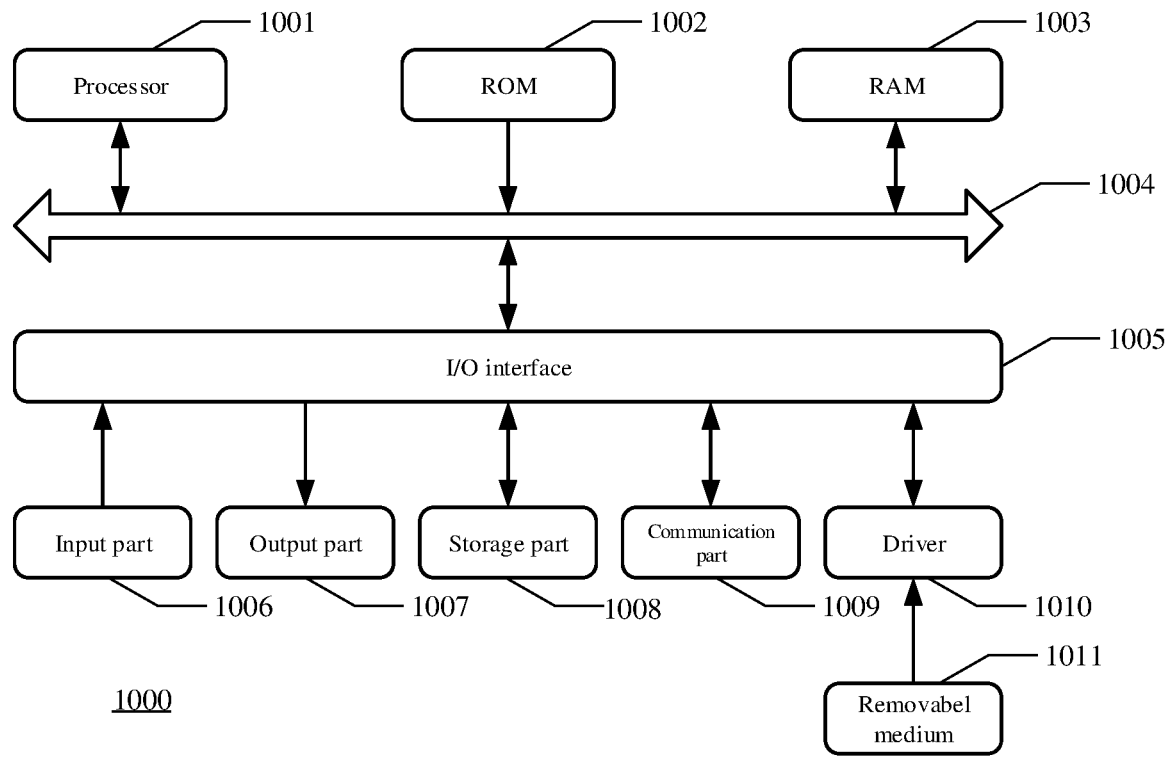
FIG. 10 schematically shows a schematic block diagram of an electronic device according to the embodiments of the present disclosure.

FIG. 10 schematically shows a schematic block diagram of an electronic device according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, an electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the device 1000 may also be stored. The computing unit 1001, the ROM 1002, and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or a dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processing described above, such as the method of processing the cross-domain authorization and the method of processing the cross-domain call. For example, in some embodiments, the method of processing the cross-domain authorization and the method of processing the cross-domain call may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the method of processing the cross-domain authorization and the method of processing the cross-domain call described above. Alternatively, in other embodiments, the computing unit 1001 may be configured to execute the method of processing the cross-domain authorization and the method of processing the cross-domain call by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing a cross-domain authorization, comprising:
    displaying, in response to a received policy deployment request, at least one cross-domain authorization option associated with a target application, wherein the target application is an application to be configured for a cross-domain authorization indicated by the policy deployment request;
    acquiring policy description data input by a user for the at least one cross-domain authorization option;
    generating a cross-domain authorization policy for the target application according to the policy description data; and
    associating the cross-domain authorization policy with an application programming interface API object of the target application, so as to perform a cross-domain call for the target application according to the associated API object and cross-domain authorization policy,
    wherein the associating the cross-domain authorization policy with an application programming interface API object of the target application comprises:
        determining, for at least one API object associated with the target application, whether a policy conflict exists between the cross-domain authorization policy and a preset call attribute of the at least one API object, according to the preset call attribute of the at least one API object; and
        performing, for at least one first API object without policy conflict, an association operation between the cross-domain authorization policy and each of the at least one first API object.

2. The method of claim 1, further comprising:
    determining, for at least one second API object with the policy conflict, whether a conflict elimination is allowed for the preset call attribute of each of the at least one second API object; and
    performing, for at least one third API object after the conflict elimination, an association operation between the cross-domain authorization policy and each of the at least one third API object.

3. The method of claim 1, further comprising:
    displaying, in response to a received policy change request for the target application, at least one configured cross-domain authorization option associated with the target application;
    acquiring policy change data input by the user for the at least one configured cross-domain authorization option;
    updating the cross-domain authorization policy for the target application according to the policy change data; and
    associating the updated cross-domain authorization policy with the API object of the target application, so as to perform the cross-domain call for the target application according to the associated API object and updated cross-domain authorization policy.

4. The method of claim 1, further comprising:
    configuring a flow control parameter associated with the API object, so as to perform the cross-domain call for the target application according to the flow control parameter and the cross-domain authorization policy,
    wherein the flow control parameter indicates a cross-domain call request threshold allowed for the API object to access within a unit time.

5. The method of claim 1, further comprising:
    configuring a cross-domain enable parameter associated with the API object, so as to perform the cross-domain call for the target application according to the cross-domain enable parameter and the cross-domain authorization policy,
    wherein the cross-domain enable parameter indicates whether the API object allows enabling the cross-domain call service.

6. An electronic device, comprising:
    at least one processor; and
    a memory communicatively connected to the at least one processor, wherein the memory stores instructions executable by the at least one processor, and the instructions, when executed by the at least one processor, cause the at least one processor to perform the method of claim 1.

7. A non-transitory computer-readable storage medium having computer instructions stored thereon, wherein the instructions, when executed by a processor, cause the processor to implement the method of claim 1.

8. A method of processing a cross-domain call, comprising:
    receiving a cross-domain call request from a requester, wherein the cross-domain call request indicates a target application the requester requests to call, and the requester and the target application belong to different network domains;
    acquiring a preset cross-domain authorization policy associated with an API object of the target application, wherein the API object is an interface object for the target application to provide a cross-domain call service;
    determining, according to the cross-domain authorization policy and the cross-domain call request, whether the requester has a cross-domain call permission for the target application; and
    establishing a cross-domain route between the requester and the target application in response to determining that the requester has the cross-domain call permission for the target application, so that the target application acquires and responds to the cross-domain call request based on the cross-domain route, wherein an association relationship between the preset cross-domain authorization policy and the API object of the target application is obtained by:
  determining, for at least one API object associated with the target application, whether a policy conflict exists between the preset cross-domain authorization policy and a preset call attribute of the at least one API object, according to the preset call attribute of the at least one API object; and
  performing, for at least one first API object without policy conflict, an association operation between the preset cross-domain authorization policy and each of the at least one first API object.

9. The method of claim 8, wherein the acquiring a preset cross-domain authorization policy associated with an API object of the target application comprises:
  acquiring, for at least one API object associated with the target application, a cross-domain enable parameter associated with each of the API objects;
  determining, according to the cross-domain enable parameter associated with each of the API objects, whether each of the API objects allows enabling a cross-domain call service; and
  acquiring, for at least one API object allowing enabling the cross-domain call service, a cross-domain authorization policy associated with each of the API objects.

10. The method of claim 8, wherein,
the cross-domain call request contains a call interface information associated with the requester and a call type information associated with the requester; and
the determining, according to the cross-domain authorization policy and the cross-domain call request, whether the requester has a cross-domain call permission for the target application comprises:
  determining whether the requester has a cross-domain call request permission for the target application, and determining whether the target application has a cross-domain call response permission for the requester, according to the cross-domain authorization policy associated with the API object, the call interface information in the cross-domain call request and the call type information in the cross-domain call request; and
  determining that the requester has a permission to call the target application across domains through the API object, in response to determining that the requester has the cross-domain call request permission for the target application and the target application has the cross-domain call response permission for the requester.

11. The method of claim 10, wherein,
in response to determining that the requester has a permission to call the target application across domains through M API objects, the establishing a cross-domain route between the requester and the target application comprises:
  determining a network performance information of M cross-domain routes formed between the requester and each API object of the M API objects, wherein the network performance information indicates a network performance of a corresponding cross-domain route; and
  selecting a cross-domain route with a best network performance from the M cross-domain routes as the cross-domain route between the requester and the target application, wherein, M is an integer greater than 1, and the network performance information comprises a network delay information and/or a network bandwidth information.

12. The method of claim 11, wherein the target application acquiring and responding to the cross-domain call request based on the cross-domain route comprises:
  transmitting the cross-domain call request to the target application through the API object; and/or
  transmitting a cross-domain call response information acquired from the API object to the requester, wherein the cross-domain call response information is obtained by the target application responding the cross-domain call request, and
  wherein the transmitting the cross-domain call request to the target application through the API object comprises:
    adding the cross-domain authorization policy associated with the API object to a request header of the cross-domain call request, so as to obtain a processed cross-domain call request; and
    transmitting the processed cross-domain call request to the target application through the API object, so that the target application determines, according to the processed cross-domain call request, whether to allow a current cross-domain call.

13. The method of claim 12, further comprising:
  acquiring a flow control parameter associated with the API object of the target application;
  wherein the transmitting the cross-domain call request to the target application through the API object comprises:
    adding the cross-domain authorization policy associated with the API object and the flow control parameter associated with the API object to a request header of the cross-domain call request, so as to obtain a processed cross-domain call request; and
    transmitting the processed cross-domain call request to the target application through the API object, so that the target application determines, according to the processed cross-domain call request, whether to allow a current cross-domain call.

14. The method of claim 8, further comprising: prior to acquiring a cross-domain authorization policy associated with the API object of the target application, acquiring a user attribute certificate associated with the requester;
  determining, according to the user attribute certificate, whether the requester has subscribed to a cross-domain call service for the target application; and
  performing an operation of acquiring the cross-domain authorization policy, in response to determining that the requester has subscribed to the cross-domain call service for the target application.

15. The method of claim 8, further comprising: prior to acquiring a cross-domain authorization policy associated with the API object of the target application, acquiring service contract data associated with the target application;
  determining, according to the service contract data, whether the target application has registered a cross-domain call service associated with the cross-domain call request; and
  performing an operation of acquiring the cross-domain authorization policy, in response to determining that the target application has registered the cross-domain call service associated with the cross-domain call request.

16. The method of claim 8, further comprising: prior to building a cross-domain route between the requester and the target application,
> determining, according to a pre-check time feature in the cross-domain authorization policy, whether to transmit the cross-domain call request to the target application through the API object, so that the target application determines, according to the cross-domain call request, whether to allow a current cross-domain call.

17. The method of claim 8, wherein the requester and the target application are browsers belonging to different network domains; and the API object is encapsulated in a browser plug-in or a browser component, or built into a browser.

18. An electronic device, comprising:
> at least one processor; and
> a memory communicatively connected to the at least one processor, wherein the memory stores instructions executable by the at least one processor, and the instructions, when executed by the at least one processor, cause the at least one processor to perform the method of claim 8.

19. A non-transitory computer-readable storage medium having computer instructions stored thereon, wherein the instructions, when executed by a processor, cause the processor to implement the method of claim 8.

* * * * *